US010572955B2

(12) United States Patent
Mese et al.

(10) Patent No.: US 10,572,955 B2
(45) Date of Patent: Feb. 25, 2020

(54) PRESENTING CONTEXT FOR CONTACTS

(71) Applicant: Lenovo (Singapore) Pte. Ltd., Singapore (SG)

(72) Inventors: John Carl Mese, Cary, NC (US); Russell Speight VanBlon, Raleigh, NC (US); Arnold S. Weksler, Raleigh, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 213 days.

(21) Appl. No.: 14/461,788

(22) Filed: Aug. 18, 2014

(65) Prior Publication Data

US 2016/0048581 A1 Feb. 18, 2016

(51) Int. Cl.
*G06F 17/30* (2006.01)
*G06Q 50/00* (2012.01)

(52) U.S. Cl.
CPC .................................... *G06Q 50/01* (2013.01)

(58) Field of Classification Search
None
See application file for complete search history.

(56) References Cited

U.S. PATENT DOCUMENTS

| | | | | |
|---|---|---|---|---|
| 9,207,832 | B1 * | 12/2015 | Khouri | G06Q 10/10 |
| 9,336,321 | B1 * | 5/2016 | Hayden | G06F 17/3089 |
| 2009/0177484 | A1 * | 7/2009 | Davis | G06Q 30/02 705/346 |
| 2015/0212697 | A1 * | 7/2015 | Nordstrom | G06F 3/04842 715/256 |

* cited by examiner

*Primary Examiner* — Tuankhanh D Phan
(74) *Attorney, Agent, or Firm* — Ference & Associates LLC

(57) ABSTRACT

An embodiment provides a method, including: detecting, using a processor, an electronic communication between a user device and an entity device; thereafter accessing, using a processor, a contextual information store including automatically selected text data derived from past communications associated with the entity device; and providing, using an output element of the device, contextual information obtained from the contextual information store during the electronic communication between the user device and the entity device. Other aspects are described and claimed.

20 Claims, 3 Drawing Sheets

PRESENTING CONTEXT FOR CONTACTS

BACKGROUND

Today people use many different types of devices (e.g., smart phones, laptop computers, personal computers, tablets, etc.) to communicate with one another. Additionally, users have many different options when it comes to methods of communication, for example, a person can email, call, text, video conference, and the like. However, with busy lives and the increasing ability to stay connected with more and more people, it can be difficult to remember the last conversation you had with a particular person, or even worse remembering/recognizing the person at all. Additionally, even with the advent of social media, it can be difficult to keep up with the lives of those people we know.

BRIEF SUMMARY

In summary, one aspect provides a method, comprising: detecting, using a processor, an electronic communication between a user device and an entity device; thereafter accessing, using a processor, a contextual information store including automatically selected text data derived from past communications associated with the entity device; and providing, using an output element of the device, contextual information obtained from the contextual information store during the electronic communication between the user device and the entity device.

Another aspect provides a device, comprising: an output element; at least one processor operatively coupled to the output element; a memory device that stores instructions executable by the processor to: detect an electronic communication between a user device and an entity device; thereafter access a contextual information store including automatically selected text data derived from past communications associated with the entity device; and provide, using the output element of the device, contextual information obtained from the contextual information store during the electronic communication between the user device and the entity device.

A further aspect provides a product, comprising: a storage device having code stored therewith and executable by a processor, the code comprising: code that detects an electronic communication between a user device and an entity device; code that thereafter accesses a contextual information store including automatically selected text data derived from past communications associated with the entity device; and code that provides, using an output element of the device, contextual information obtained from the contextual information store during the electronic communication between the user device and the entity device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
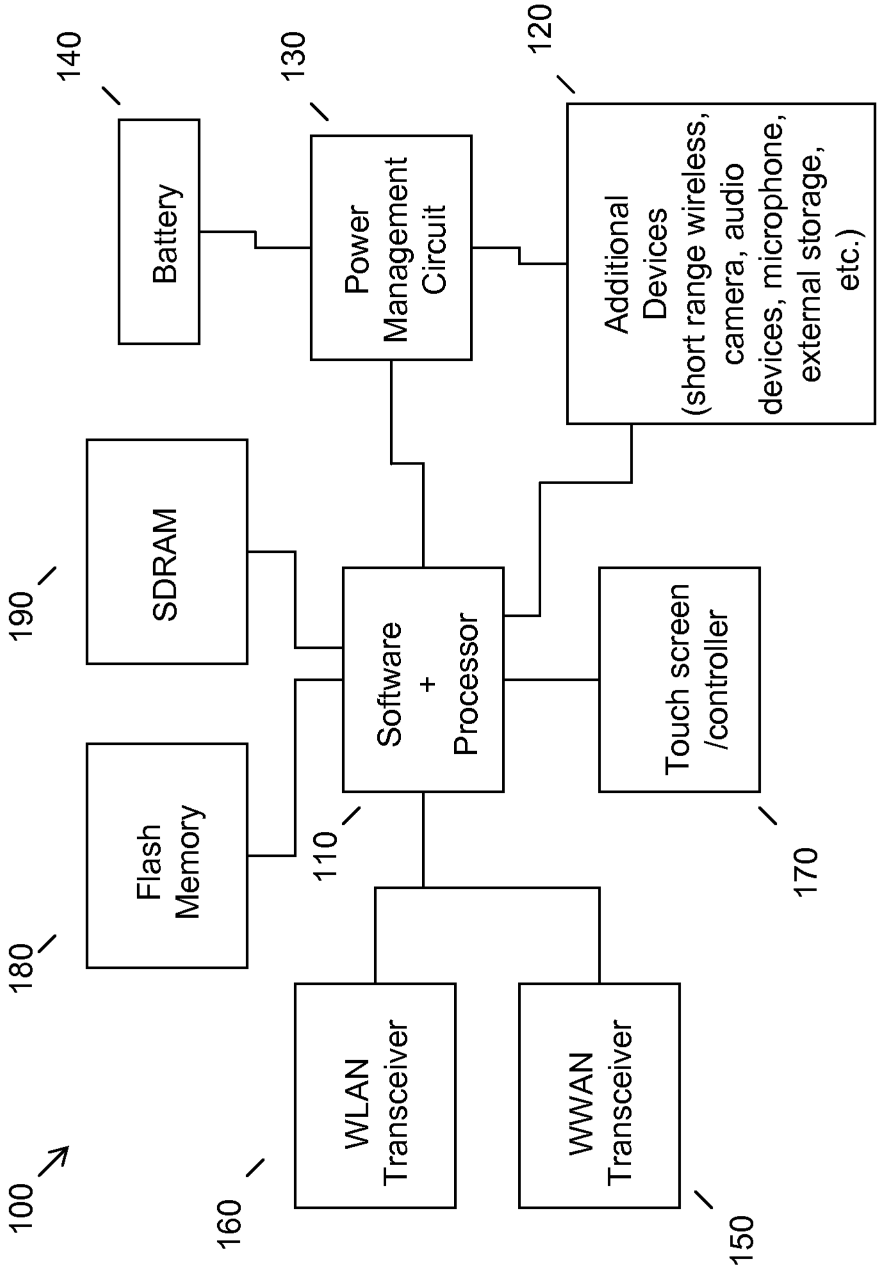
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When communicating with someone it can be difficult to recall relevant information about the person. In some cases, it is difficult to associate a particular contact with the correct context. For example, if a child's school calls, the phone number may not be programmed into the parent's phone. Without the caller identification displaying the school name, a parent may not even recognize the school's phone number. Additionally, even with the ability to access social media which may tell the story of a person's life, it can be difficult to keep track of milestones in the lives of those that we are connected to on social media.

One current method of deciphering context is actually remembering it. This relies on a person's memory to remember relevant information. With the number of people we are in contact with everyday it can be very difficult to remember the relevant information associated with any given entity. Additionally, with the increase in social media, people expect a person to know the major life milestones (e.g., birth of a baby, wedding, new job, birthday, etc.) that they have recently experienced. With the busy lives that we lead, it can be difficult to keep up with the lives of everyone that we come into contact with, especially since social media allows us to keep in contact with hundreds and thousands of people. Another option to decipher context or to help assist in remembering is to read through previous communications or reference social media accounts before communicating with the person. However, this can be time consuming and tedious. Additionally, in some cases it may not be feasible, such as when receiving a phone call.

Accordingly, an embodiment provides a method for associating a communication, which may be incoming or outgoing, such as an email, a text, a phone call, a video call, etc., with context for an entity (e.g., individual, business, etc.).

Once the entity has been identified, which may be accomplished in a variety of ways, a store of contextual information may be built for that entity.

The store of contextual information may include text data derived from past communications of the entity. For example, the store of contextual information may include past communications with the user receiving a call from the entity or making a call to an entity. Such past communications may for example include past emails, phone conversations (that may be transcribed to text), past text messages, and the like. Similarly, the store of contextual information may include past textual communications derived from remote stores of information, e.g., recent social media posts, geographic information related to or associated with an entity's location, etc.

Contextual information thus may be associated with an entity, for example, by searching previous communications with the entity using keywords. As another example, an embodiment may access social media to find information regarding posts that the entity has made, again using key words. The selected textual communications associated with the entity may be time or number limited, e.g., being created within a predetermined time frame such as last five communications with a user, social media posts from the last week, etc.

Once the contextual information is collected, an embodiment may provide the contextual information to a user during a communication with the entity. For example, an embodiment may display a summary of the contextual information on a display device for a user receiving a telephone call or an email from the entity. The contextual information may be provided as it is found, i.e., unfiltered, or an embodiment may first filter or otherwise process the contextual information of the entity to provide it a processed or filtered form. An embodiment thus may summarize or filter the contextual information, either before presenting it to the user or filtering may be ongoing (e.g., a dynamically updating contextual display).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
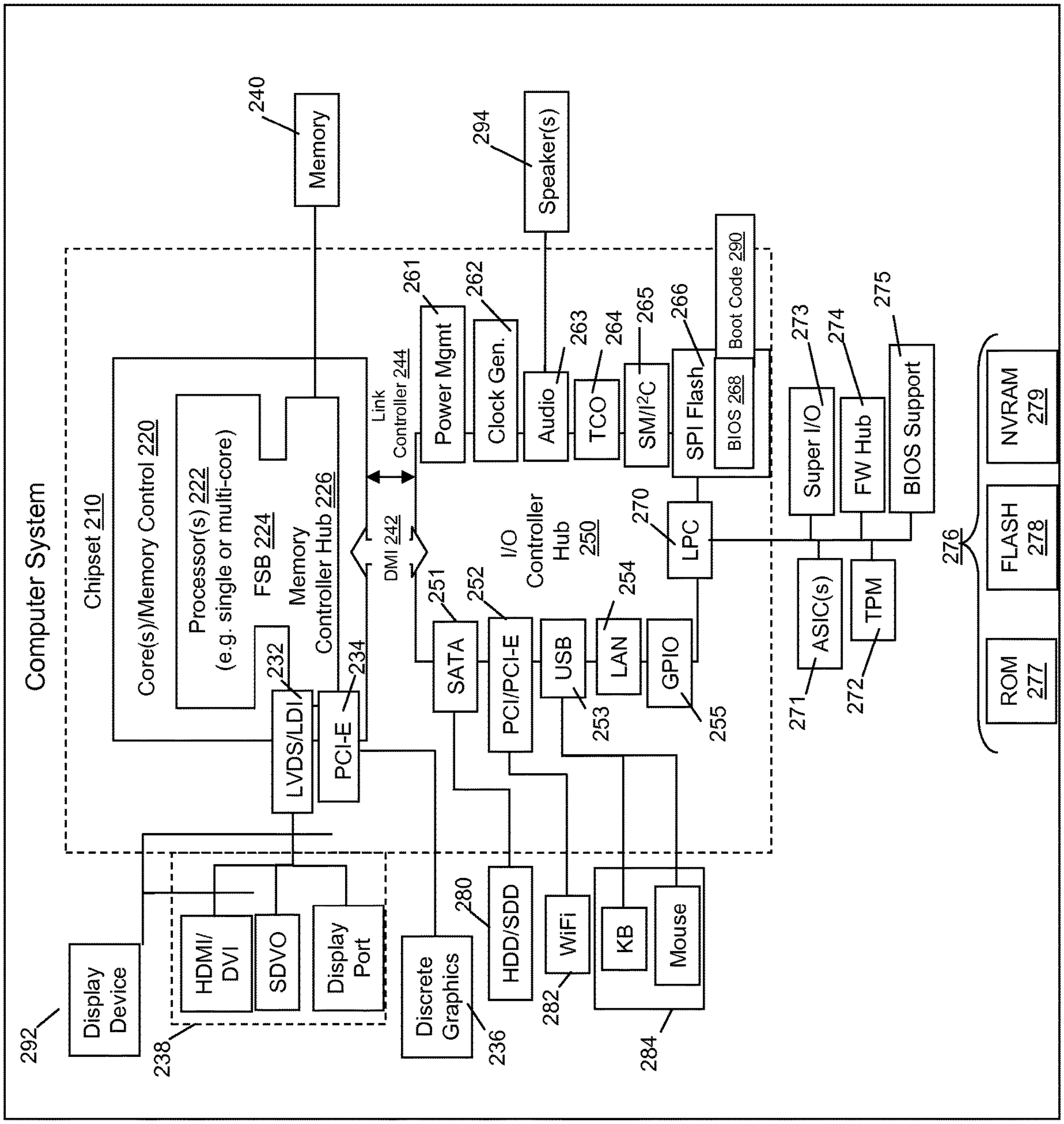
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in information handling devices such as smart phones, laptops, personal computers, tablets, and/or other electronic devices which users use to communicate with an entity (e.g., an individual, business, etc.). For example, the circuitry outlined in FIG. 1 may be implemented in a tablet or smart phone embodiment, whereas the circuitry outlined in FIG. 2 may be implemented in a personal computer embodiment.

Figure 3:
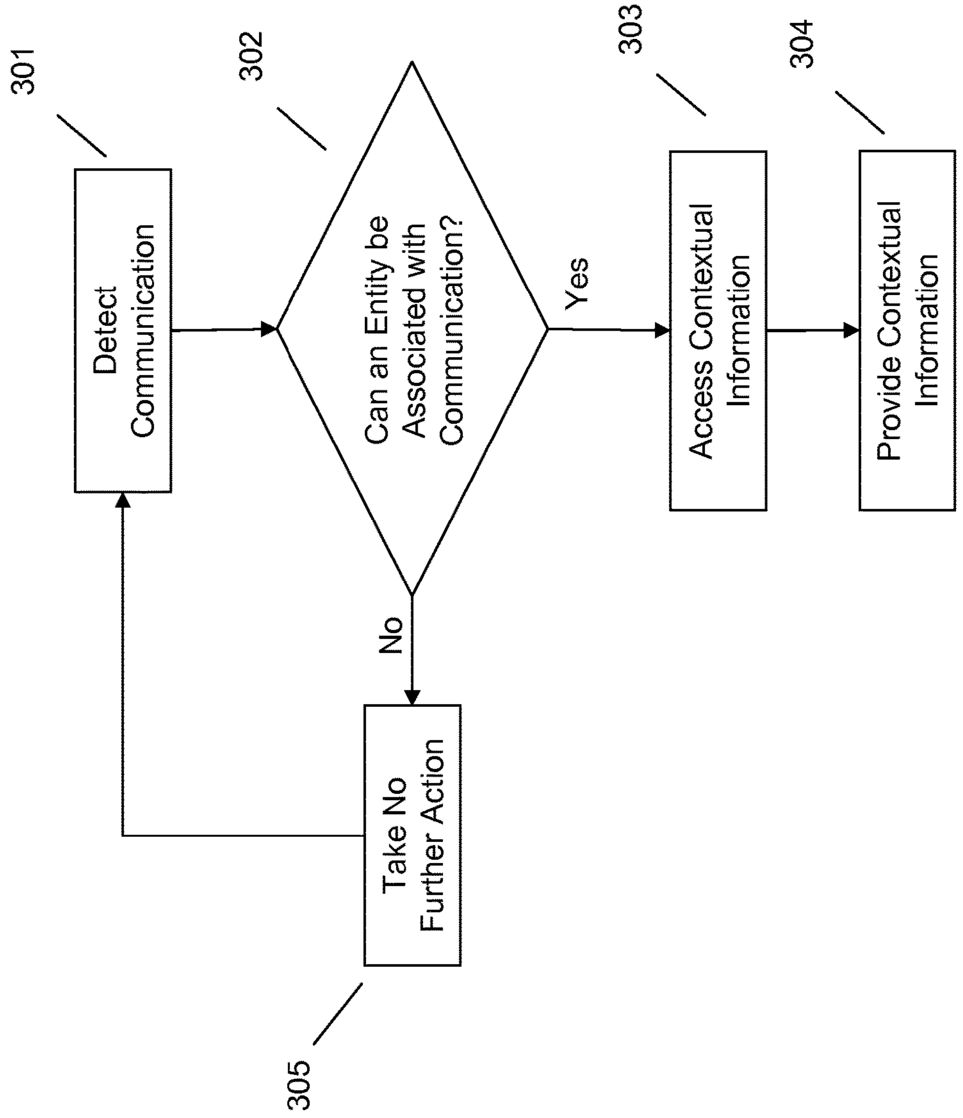
FIG. 3 illustrates an example method of presenting context for contacts.

Referring now to FIG. 3, an embodiment may at 301 detect an electronic communication (e.g., email, text message, phone call, video call, etc.). This electronic communication may either be an incoming communication (i.e., an entity is contacting the user) or an outgoing message (i.e., the user is contacting an entity). At 302 an embodiment may attempt to associate an entity with the electronic communication using at least one characteristic of the electronic communication (e.g., phone number, email address, entity name, content of the communication, location of the entity, etc.). If an embodiment is unable to associate an entity with the communication, an embodiment may take no further action at 305.

Once an embodiment is able to associate an entity with a communication at 302, an embodiment may access a store of contextual information associated with the entity at 303. The store of contextual information includes textual data or communication information associated with the entity. This textual data or communication information may be derived in a variety of ways.

For example, the contextual information in the store may include recent social media content (e.g., within a predetermined time) associated with the entity (e.g., the social media content was created by the entity, the entity is included in or referenced by social media content, the entity is related to the social media content in some way, etc.). As another example, an embodiment may access a contextual information store that is populated with previous communications between a user and the entity, even if made using a different modality (e.g., voice calls, emails, texts, instant messages, etc.). These selected textual communications contained in the store may be current, e.g., may be refreshed in a frequent or periodic manner.

Additionally, the textual communications of the store may be time-stamped and this timing information may be included in a display of contextual information such that the user knows when the contextual data was relevant, e.g., when a conversation took place. For example, if, in a conversation, the user's brother states they have a football game in two weeks, an embodiment may display this information and time-stamp the conversation based contextual summary. The user may then realize it has been more than two weeks and be reminded to ask how the football game went.

An embodiment may access other devices, applications or sources to collect contextual information. For example, an embodiment may, once the entity is known, access a FACEBOOK application to collect the latest posts the entity has made. Likewise, if an entity is known to be located in a particular geographic area, weather data or current events of that area may be included in the contextual data store. FACEBOOK is a registered trademark of Facebook, Inc. in the United States and other countries.

Due to the abundance of contextual information that may be collected, an embodiment may filter the contextual information, e.g., search the contextual information using a keyword and collect only the content containing the keyword. For example, an embodiment may detect what the current communication is regarding (e.g., keyword derived from an incoming text message or ongoing phone conversation) and find information containing or relating to the current communication. This may be an ongoing process, e.g., the contextual summary provided may be refreshed during the course of the communication between the user and the entity.

For example, if the user is discussing school with another user, an embodiment may search the contextual information for the keyword school and only provide that contextual information, e.g., on the user's display. As another example, an embodiment may determine the location that the entity is calling from and search the contextual information using the location as the keyword. Alternatively or additionally, a user may select keywords for an embodiment to use when searching social media content. For example, a user may want to search for major life events and indicate keywords to search. An embodiment may then collect the contextual information including these keywords.

An embodiment may provide a contextual information store remotely, on a user's device, or a combination of the foregoing. For example, an embodiment may collect textual information from various sources (previous communications, social media posts by the entity, etc.) and label these in an organization of contextual data tags. This permits quick retrieval in the presence of a large amount of contextual information with a store. For example, contextual information may be stored and organized according to a keyword such that it is tagged with the keyword (e.g., weather, location, milestone, calendar, birthday, other involved contact names, time, etc.) for easier searching at a later time. For example, once an embodiment collects the contextual information it may associate a keyword therewith.

Once the contextual information has been collected an embodiment may provide the contextual information to the user at 304. The contextual information may be provided in a variety of ways, for example, using a visual display, an auditory output, a haptic output, and the like. For example, an embodiment may display the contextual information to the user on a display device (e.g., the screen of a smart phone, monitor, television, etc.) or read the contextual information out loud to the user.

As described herein, an embodiment may provide the contextual information in its entirety, as some level of organization may be leveraged with respect to the contextual information store, e.g., only selecting contextual data tags matching a key word derived from the communication with the entity. Additionally, an embodiment may provide additional information with the contextual information derived from the contextual information store (e.g., time-stamp, other involved contacts, contextual information source, etc.). Alternatively or additionally, an embodiment may, before displaying the contextual information at 304, filter or summarize the contextual information collected. For example, an embodiment may take the contextual information collected from the store and determine key words in the contextual information and display that keyword information in bullet point format.

For example, an embodiment may determine the subject of the contextual information and label it with one or more keywords. When the contextual information is displayed, rather than displaying the entirety of the contextual information an embodiment may display just the keywords that the contextual information was labeled/tagged with. As such, a user may then be able to select that keyword (e.g., provided in a display) and the underlying contextual information included under that label may be displayed in its entirety. A user may also be able to remove contextual information that they do not want displayed.

Additional filtering of the contextual information may be provided before providing it to a user. This filtering may be completed using a characteristic of the contextual information (e.g., time created, location, content, etc.). For example, an embodiment may only display the contextual information created since the last communication with the entity. In other words, for example, an embodiment may determine that the user communicated with the entity one week ago, even though there is contextual information in the store from one month ago. An embodiment may then only display the contextual information, e.g., derived from social media content, that has been created in the last week. As an additional example, an embodiment may filter and only display the contextual information associated with the content of the current communication.

Accordingly, as illustrated by the example embodiments and the figures, an embodiment provides a method of detecting an incoming or outgoing communication. An embodiment may then associate an entity with the communication and collect contextual information related to the entity. The contextual information collected may then be provided to the user. One embodiment may summarize the contextual information before it is displayed. Additionally or alternatively, an embodiment may filter the contextual information thereby giving the user the most recent or relevant contextual information. Thus, one embodiment allows a user to receive contextual information relating to the entity in order to remember contextual information about the entity, such as the last conversation or how the user may know this entity. Additionally, the contextual information may allow a user to appear to stay connected with an entity without the user actually having to access social media everyday.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages or machine code. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, a current electronic communication at a user device associated with a user and from an entity device associated with an entity that initiated the current electronic communication;

identifying an entity corresponding to the entity device by associating the entity with the current electronic communication using at least one characteristic of the electronic communication, wherein the at least one characteristic is derived at least in part from content of the current electronic communication;

accessing, responsive to the receiving, a contextual information store including automatically selected text data derived from past communications associated with the identified entity;

searching, using information derived from the current electronic communication, the contextual information store for contextual information related to the identified entity and related to a topic and being derived from a keyword of the current electronic communication; and providing, to the user using an output element of the user device, a subset of the contextual information related to the entity while the current electronic communication between the user device and the entity device is ongoing, wherein the subset of the contextual information comprises the contextual information filtered based upon the current electronic communication and historical communication between the user and the entity.

2. The method of claim 1, wherein the accessing comprises accessing the contextual information store over a wireless network.

3. The method of claim 1, wherein the automatically selected text data derived from past communications comprise social media textual communications.

4. The method of claim 1, wherein the accessing comprises accessing the contextual information store of the user device.

5. The method of claim 4, wherein the automatically selected text data derived from past communications comprise at least one previous electronic communication between the user device and the entity device.

6. The method of claim 1, wherein the providing comprises providing contextual information using a modality selected from the group consisting of a visual display, an auditory output, and a haptic output.

7. The method of claim 1, wherein the automatically selected text data derived from past communications are selected using a predetermined timeframe.

8. The method of claim 1, further comprising filtering the automatically selected text data derived from past communications using key words.

9. The method of claim 8, wherein the key words are derived from one or more past communications between the user device and the entity device.

10. The method of claim 1, wherein the automatically selected text data derived from past communications comprise one or more communications transmitted between the user device and the entity device utilizing a modality which is other than the modality of the electronic communication.

11. A device, comprising:

an output element;

at least one processor operatively coupled to the output element;

a memory device that stores instructions executable by the processor to:

receive a current electronic communication at a user device associated with a user and from an entity device associated with an entity that initiated the current electronic communication;

identify an entity corresponding to the entity device by associating the entity with the current electronic communication using at least one characteristic of the electronic communication, wherein the at least one characteristic is derived at least in part from content of the current electronic communication;

access, responsive to the receiving, a contextual information store including automatically selected text data derived from past communications associated with the identified entity;

search, using information derived from the current electronic communication, the contextual information store for contextual information related to the identified entity and related to a topic and being derived from a keyword of the current electronic communication; and provide, to the user using the output element of the user device, a subset of the contextual information related to the entity while the current electronic communication between the user device and the entity device is ongoing, wherein the subset of the contextual information comprises the contextual information filtered based upon the current electronic communication and historical communication between the user and the entity.

12. The device of claim 11, wherein to access comprises accessing the contextual information store over a wireless network.

13. The device of claim 11, wherein the automatically selected text data derived from past communications comprise social media textual communications.

14. The device of claim 11, wherein to access comprises accessing the contextual information store of the user device.

15. The device of claim 14, wherein the automatically selected text data derived from past communications comprise at least one previous electronic communication between the user device and the entity device.

16. The device of claim 11, wherein the providing comprises providing contextual information using a modality selected from the group consisting of a visual display, an auditory output, and a haptic output.

17. The device of claim 11, wherein the automatically selected text data derived from past communications are selected using a predetermined timeframe.

18. The device of claim 11, further comprising filtering the automatically selected text data derived from past communications using key words.

19. The device of claim 18, wherein the key words are derived from one or more past communications between the user device and the entity device.

20. A product, comprising:

a non-signal storage device having code stored therewith and executable by a processor, the code comprising:

code that receives a current electronic communication at a user device associated with a user and from an entity device associated with an entity that initiated the current electronic communication;

code that identifies an entity corresponding to the entity device by associating the entity with the current electronic communication using at least one characteristic of the electronic communication, wherein the at least one characteristic is derived at least in part from content of the current electronic communication;

code that accesses, responsive to the receiving, a contextual information store including automatically selected text data derived from past communications associated with the identified entity;

code that searches, using information derived from the current electronic communication, the contextual information store for contextual information related to the identified entity and related to a topic and being derived from a keyword of the current electronic communication; and code that provides, to the user using an output element of the user device, a subset of the contextual information related to the entity while the current electronic communication between the user device and the entity device is ongoing, wherein the subset of the contextual information comprises the contextual information filtered based upon the current electronic communication and historical communication between the user and the entity.

* * * * *